United States Patent
Liu et al.

(10) Patent No.: US 7,910,081 B2
(45) Date of Patent: Mar. 22, 2011

(54) PROCESS FOR THE PRODUCTION OF FUMED SILICA

(75) Inventors: Joanne Liu, Reading, MA (US); Yakov E. Kutsovsky, Arlington, MA (US); George P. Fotou, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 48 days.

(21) Appl. No.: 11/740,134

(22) Filed: Apr. 25, 2007

(65) Prior Publication Data

US 2007/0253884 A1 Nov. 1, 2007

Related U.S. Application Data

(60) Provisional application No. 60/796,166, filed on Apr. 28, 2006.

(51) Int. Cl.
*C01B 33/12* (2006.01)

(52) U.S. Cl. .................... 423/337; 423/335; 423/336

(58) Field of Classification Search ........... 423/335–337
See application file for complete search history.

(56) References Cited

U.S. PATENT DOCUMENTS

| | | | |
|---|---|---|---|
| 2,990,249 A | 6/1961 | Wagner | |
| 3,954,945 A | 5/1976 | Lange et al. | |
| 4,048,290 A | 9/1977 | Lee | |
| 4,108,964 A | 8/1978 | Kratel et al. | |
| 4,292,290 A | 9/1981 | Tunison, III | |
| 5,785,941 A * | 7/1998 | Maginot et al. | 423/337 |
| 6,322,765 B1 | 11/2001 | Mühlhofer et al. | |
| 2002/0102199 A1 * | 8/2002 | Nishimine et al. | 423/337 |
| 2004/0156773 A1 | 8/2004 | Kutsovsky | |
| 2006/0182554 A1 | 8/2006 | Stolzer | |

FOREIGN PATENT DOCUMENTS

| | | |
|---|---|---|
| EP | 0 622 334 A1 | 11/1994 |
| EP | 1 213 263 A2 | 6/2002 |
| EP | 1 681 233 A1 | 7/2006 |
| GB | 661685 | 11/1951 |
| GB | 708970 | 5/1954 |
| GB | 1113219 | 5/1968 |
| GB | 1207860 | 10/1970 |
| GB | 2 049 641 A | 12/1980 |

OTHER PUBLICATIONS

Abdel-Gayed et al., "Dependence of Turbulent Burning Velocity on Turbulent Reynolds Number and Ratio of Laminar Burning Velocity to R.M.S. Turbulent Velocity," *Sixteenth Symposium (International) on Combustion*, 1725-1735 (The Combustion Institute, Pittsburgh, PA 1976).

Ulrich et al., "Aggregation and Growth of Submicron Oxide Particles in Flames," *Journal of Colloid and Interface Science*, 87(1): 257-265 (May 1982).

International Preliminary Report on Patentability with respect to PCT/US2007/009993 (Nov. 6, 2008).

* cited by examiner

*Primary Examiner* — Timothy C Vanoy
*Assistant Examiner* — Diana J Liao

(57) ABSTRACT

The invention provides a process for the production of fumed silica. The process comprises providing a silicon halide feedstock comprising about 80% to 100% methyltrichlorosilane, combining the silicon halide feedstock with hydrogen gas and oxygen gas to form a reactant mixture, discharging the reactant mixture out of a burner, and combusting the hydrogen gas and the oxygen gas of the reactant mixture so as to hydrolyze the silicon halide feedstock to produce fumed silica. Hydrogen ($H_2$) is present in a mole fraction of about 0.11 or less based on the reactant mixture, and/or the velocity of the reactant mixture upon exiting the burner is about 25 m/s or more.

18 Claims, No Drawings

PROCESS FOR THE PRODUCTION OF FUMED SILICA

CROSS-REFERENCE TO RELATED APPLICATIONS

This patent application claims the benefit of U.S. Provisional Patent Application No. 60/796,166, filed Apr. 28, 2006 (the entire contents of which are incorporated by reference herein).

FIELD OF THE INVENTION

The invention pertains to processes for the production of fumed silica.

BACKGROUND OF THE INVENTION

There are many applications for fumed metal oxides, particularly for fumed silica, of extremely fine particle size. Such applications include fillers for polymers such as rubber, paper coatings (i.e., recording media), the manufacture of optical fibers and quartz glassware, thermal insulation, and chemical-mechanical polishing compositions intended for use in semiconductor manufacturing.

Fumed silica is generally produced by the vapor phase hydrolysis of chlorosilanes, such as silicon tetrachloride, in a hydrogen oxygen flame. Such processes are generally referred to as pyrogenic processes. The overall reaction is:

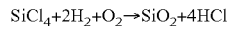

$$SiCl_4 + 2H_2 + O_2 \rightarrow SiO_2 + 4HCl$$

Organosilanes also have been used in pyrogenic processes for the production of fumed silica. In the vapor phase hydrolysis of organosilanes, the carbon-bearing fragments undergo oxidation to form carbon dioxide as a by-product along with hydrochloric acid.

In this process, submicron-sized molten spheres of silica are formed. These particles collide and fuse to form three-dimensional, branched, chain-like aggregates, of approximately 0.1-0.5 μm in length. Cooling takes place very quickly, limiting the particle growth and ensuring that the fumed silica is amorphous. These aggregates in turn form agglomerates of 0.5-44 μm (about 325 US mesh). Fumed silicas generally have very high purity, with total impurities in many cases below 100 ppm (parts per million). This high purity makes fumed silica dispersions particularly advantageous for many applications.

Numerous methods have been developed in the art to produce fumed silica via pyrogenic processes. U.S. Pat. No. 2,990,249 describes a process for the pyrogenic production of fumed silica. In accordance with this process, a gaseous feedstock comprising a fuel, such as methane or hydrogen, oxygen, and a volatile silicon compound, such as silicon tetrachloride, wherein the oxygen is present in a stoichiometric or hyperstoichiometric proportion, is fed into a burner supporting a short flame having a ratio of height to diameter of about 2:1 or below. Water formed by the combustion of the fuel in oxygen reacts with the silicon tetrachloride to produce silicon dioxide particles, which coalesce and aggregate to form fumed silica. The effluent from the burner is cooled, and the fumed silica is then collected.

U.S. Pat. No. 4,108,964 describes a process for the pyrogenic production of fumed silica using organosilanes as the silicon-containing component. In accordance with this process, an organosilane, such as methyltrichlorosilane, is volatilized at a temperature above the boiling point of the organosilane. The vaporized organosilane is mixed with a gaseous fuel, such as hydrogen or methane, and an oxygen-containing gas containing from 15-100% oxygen, to form a feedstock. The feedstock is fed to a flame supported by a burner at various flow rates to produce fumed silica. The volume ratios of the individual gas components are reported not to be of critical importance. The molar ratio of the organosilane to the water-forming gases generally is said to be in the range of from 1:0 to 1:12.

Despite the foregoing processes for producing fumed silica, there remains a need for other processes for producing fumed silica, especially processes for producing fumed silica more economically and/or efficiently, wherein the fumed silica exhibits desirable properties such as particle uniformity, dispersibility, and the like.

The invention provides such a process. These and other advantages of the invention, as well as additional inventive features, will be apparent from the description of the invention provided herein.

BRIEF SUMMARY OF THE INVENTION

The invention provides a process for the production of fumed silica comprising (a) providing a silicon halide feedstock comprising about 80% to 100% methyltrichlorosilane, (b) combining the silicon halide feedstock with hydrogen gas and oxygen gas to form a reactant mixture, (c) discharging the reactant mixture out of a burner, wherein the hydrogen ($H_2$) is present in a mole fraction of about 0.11 or less based on the reactant mixture and/or the velocity of the reactant mixture upon exiting the burner is about 25 mls or more, and (d) combusting the hydrogen gas and the oxygen gas of the reactant mixture so as to hydrolyze the silicon halide to produce fumed silica.

DETAILED DESCRIPTION OF THE INVENTION

The invention provides a process for the production of fumed silica. The process comprises (a) providing a silicon halide feedstock, (b) combining the silicon halide feedstock with hydrogen gas and an oxygen gas to form a reactant mixture, (c) discharging the reactant mixture out of a burner, and (d) combusting the hydrogen gas and the oxygen gas of the reactant mixture so as to hydrolyze the silicon halide to produce fumed silica.

The silicon halide can be any silicon halide capable of undergoing hydrolysis to the corresponding oxide, i.e., silica, under the conditions imposed thereon in the hydrolysis flame. Suitable silicon halides include, for example, silicon tetrachloride, silicon tetrafluoride, methyltrichlorosilane, trichlorosilane, dimethyldichlorosilane, methyldichlorosilane, methyldichloroflurosilane, dichlorosilane, dibutyldichlorosilane, ethyltrichlorosilane, propyltrichlorosilane, and mixtures thereof.

The silicon halide feedstock comprises about 80% to 100% methyltrichlorosilane (e.g., about 83% to 100% methyltrichlorosilane, about 85% to 100% methyltrichlorosilane, or about 87% to 100% methyltrichlorosilane). The silicon halide feedstock preferably comprises about 90% to 100% methyltrichlorosilane (e.g., about 91% to 100% methyltrichlorosilane, about 92% to 100% methyltrichlorosilane, about 93% to 100% methyltrichlorosilane, or about 94% to 100% methyltrichlorosilane). More preferably, the silicon halide feedstock comprises about 95% to 100% methyltrichlorosilane (e.g., about 96% to 100% methyltrichlorosilane, about 97% to 100% methyltrichlorosilane, about 98% to 100% methyltrichlorosilane, or about 99% to 100% methyltrichlorosilane). Most preferably, the silicon halide feedstock is pure or substantially pure methyltrichlorosilane (e.g., about 99.5% to 100% methyltrichlorosilane, about 99.8% to 100% methyltrichlorosilane, about 99.9% to 100% methyltrichlorosilane, about 100% methyltrichlorosilane). Ideally, the silicon halide feedstock is 100% methyltrichlorosilane.

The silicon halide feedstock typically is rendered gaseous or vaporized before being combined with the hydrogen gas and the oxygen gas to form the reactant mixture. The silicon halide feedstock can be rendered gaseous or vaporized in any suitable manner. For example, the silicon halide feedstock can be rendered gaseous or vaporized by exposure to a suitably high temperature environment.

The hydrogen gas can be provided from any suitable source and in any suitable manner.

The oxygen gas represents the oxidant for the combustion of the hydrogen gas in the process of the invention and can be employed in its pure state or admixed with other gases. Thus, the oxygen gas can be supplied as pure or substantially pure oxygen, as air, or as oxygen-enriched air. Moreover, if desired, the oxygen gas can be provided in the form of oxygen admixed with other gases such as nitrogen, argon, helium, carbon dioxide, and/or hydrogen halide.

When the oxygen gas is not supplied in pure form, e.g., when the oxygen gas is supplied as part of an oxygen-containing gas, there may or may not be water, e.g., water vapor or moisture, present with the oxygen gas. For example, when the oxygen gas is provided by supplying air, water will be present along with the oxygen gas. In such situations where water is present with the oxygen gas, such as with air, the water is optionally removed, in whole or in part, from the oxygen-containing gas. If the removal of the water from the oxygen-containing gas is desired, then the water removal can be accomplished in any suitable manner, e.g., by drying the air supplying the oxygen gas.

The reactant mixture comprises the silicon halide feedstock, the hydrogen gas, and the oxygen gas. As such, the reactant mixture generally is in gaseous form. The reactant mixture desirably comprises an at least stoichiometric quantity of the hydrogen gas and, preferably, an at least stoichiometric quantity of the oxygen gas. In other words, the reactant mixture desirably comprises a sufficient concentration of hydrogen gas so as to provide, upon combustion thereof, sufficient water to convert all or substantially all of the silicon halide of the reactant mixture to the corresponding oxide, i.e., silica. Moreover, the concentration of the oxygen gas forming part of the mixture desirably is at least sufficient to burn all or substantially all of the hydrogen gas of the reactant mixture. Preferably, the concentrations of the hydrogen gas and the oxygen gas components of the reactant mixture are at least slightly in excess of the stoichiometric requirements described herein.

Hydrogen ($H_2$) desirably is present in a mole fraction of about 0.11 or less based on the reactant mixture, i.e., the total moles of all of the reactant mixture components, which include, but are not limited to, the moles of the silicon halide feedstock, the hydrogen gas, and the oxygen gas. The $H_2$ mole fraction ($X_{H2}$) can be determined by dividing the moles of $H_2$ by the total moles of all of the reactant mixture components. The moles of $H_2$ include (a) the moles of $H_2$ in the hydrogen gas, (b) the moles, if any, of $H_2$ in the oxygen-containing gas, and (c) the moles of $H_2$ that are provided, as a practical matter, from the silicon halide feedstock components (i.e., those silicon halide feedstock components that burn quickly to provide contribute $H_2$ to the total moles of $H_2$ in the reaction mixture, such as trichlorosilane (TCS) if present in the silicon halide feedstock, but not from methyltrichlorosilane, or from silicon tetrachloride or other such silicon halides if present in the silicon halide feedstock). The moles of $H_2$ provided by any trichlorosilane in the silicon halide feedstock are equal one-half (½) of the moles of the trichlorosilane. The $H_2$ mole fraction can be about 0.06 or more (e.g., about 0.07 or more, about 0.075 or more, about 0.08 or more, about 0.085 or more, or about 0.09 or more). The $H_2$ mole fraction can be about 0.1 or less (e.g., about 0.095 or less, about 0.09 or less, about 0.085 or less, or about 0.08 or less). Typically, the $H_2$ mole fraction is about 0.06 to about 0.11 (e.g., about 0.07 to about 0.1, or about 0.075 to about 0.095).

The silicon halide feedstock, the hydrogen gas, and the oxygen gas can be combined to form the reactant mixture in any suitable manner. For example, the reactant mixture can be formed by combining the silicon halide feedstock, the hydrogen gas, and the oxygen gas prior to passing the reactant mixture into a burner, or the reactant mixture can be formed by combining the silicon halide feedstock, the hydrogen gas, and the oxygen gas in a burner, e.g., at or prior to the zone where the combustion of the hydrogen gas and the oxygen gas takes place.

The burner comprises an inlet end and a discharge end or mouth. The inlet end can define a receiving and mixing chamber wherein the reactant mixture components are introduced and combined to form the reactant mixture. Thus, for instance, the silicon halide feedstock, the hydrogen gas, and the oxygen gas can be separately introduced via separate conduits into the burner, where the reactant mixture components are combined to form the reactant mixture. Alternatively, two or all three of the silicon halide feedstock, the hydrogen gas, and the oxygen gas can be partially or entirely combined in a common conduit prior to entry thereof into the burner.

The reactant mixture is discharged from the burner and is preferably, but not necessarily, projected into a suitable enclosed reaction space. The velocity of the reactant mixture upon exiting the burner desirably is about 25 m/s or more (e.g., about 30 m/s or more, about 35 m/s or more, or about 40 m/s or more). The velocity of the reactant mixture upon exiting the burner can be about 100 m/s or less (e.g., about 95 m/s or less, about 90 m/s or less, about 85 m/s or less, about 80 m/s or less, about 75 m/s or less, about 70 m/s or less, about 65 m/s or less, about 60 m/s or less, about 55 m/s or less, about 50 m/s or less, or about 45 m/s or less). Typically, the velocity of the reactant mixture upon exiting the burner is about 25 m/s to about 100 m/s (e.g., about 30 m/s to about 50 m/s, or about 35 m/s to about 45 m/s).

A combustible gas or vapor separate from the reactant mixture can be fed into and discharged from an annular space adjacent the burner discharge end or mouth. The combustible gas or vapor discharged near the discharge end of the burner can be any suitable gas or vapor which does not react deleteriously with the components of the reactant mixture or with the products of the combustion process. Suitable combustible gases include hydrogen and methane. The flow rate of the combustible gas through the annular space desirably is sufficient to keep the mouth of the burner free of attachments of solid substances and to avoid the formation of halogen gas in waste gases. Any suitable amount of combustible gas can be utilized to achieve such results.

The oxygen gas undergoes a combustion reaction with the hydrogen gas to form water. Water formation leads to the hydrolysis of the silicon halide and the production of fumed silica.

At the zone of the combustion reaction, there exists a flame, which can be characterized by a laminar flame speed. The laminar flame speed can be determined in accordance with known techniques, such as described in the National Fire Protection Association (NFPA) Codes and Standards, particularly NFPA 68 (2002 Edition) (see especially Appendix D thereof). The laminar flame speed can be about 10 cm/s or more (e.g., about 20 cm/s or more, about 30 cm/s or more, about 35 cm/s or more, about 40 cm/s or more, or about 45 cm/s or more). The laminar flame speed can be about 80 cm/s or less (e.g., about 70 cm/s or less, about 65 cm/s or less, about 60 cm/s or less, about 55 cm/s or less about 50 cm/s or less, about 45 cm/s or less, or about 40 cm/s or less). The laminar flame speed desirably is about 20 cm/s to about 70 cm/s (e.g., about 30 cm/s to about 60 cm/s, or about 35 cm/s to about 50 cm/s), such as about 35 cm/s to about 41 cm/s, or even about 42 cm/s to about 48 cm/s.

The reactant mixture then is provided with an environment within which the combustion process can be cooled and brought to completion. Preferably, this environment is defined by the enclosed reaction space, e.g., by a reaction chamber. The combustion process can be cooled in any suitable manner. For example, the combustion process can be cooled by feeding a non-combustible gas into a reaction chamber in the reaction space. Alternatively, the combustion process can be cooled by feeding a non-combustible gas or other suitable substance into a space adjacent to the reaction space, e.g., into an annular space adjacent the reaction space. Suitable non-combustible gases include air, oxygen, and nitrogen. In that respect, in particular, the non-combustible gas can cloak the hydrolysis reaction flame and thereby cool the reaction products therefrom to below the sintering temperature of the fumed silica reaction product.

As the hydrolysis reaction flame hydrolyzes the silicon halide to produce fumed silica, careful control of the $H_2$ mole fraction and/or burner velocity as described herein serves to stabilize the hydrolysis reaction flame despite the relatively high concentration of methyltrichlorosilane in the silicon halide feedstock. The increased stability of the hydrolysis reaction flame provides for an efficient and consistent production of fumed silica.

Fumed silica typically exists in the form of aggregates of primary particles, especially aggregates having a chain-like structure composed of primary particles. Primary particles are formed by covalent bonds between atoms comprising the particles and are stable to all but the harshest conditions. At the next level of structure, primary particles are associated into secondary particles, generally referred to as aggregates. Aggregate particles comprise primary particles and are bonded together by covalent bonds and electrostatic interactions, and typically are resistant to degradation by, e.g., mechanical energy inputs such as high-shear mixing. At the next level of structure, aggregates are more loosely associated into agglomerates. Typically, agglomerates can be disassociated into the constituent aggregates via mechanical energy inputs.

The fumed silica produced by the inventive process can have any suitable average primary particle size, aggregate particle size, agglomerate particle size, and surface area. Particle size is the diameter of the smallest sphere that encloses or encompasses the particle. Surface area is determined by the well-known BET method.

The fumed silica can have an average primary particle size of about 2 nm or more (e.g., about 3 nm or more, about 5 nm or more, about 10 nm or more, about 15 nm or more, about 20 nm or more, about 25 nm or more, about 30 nm or more, or about 35 nm or more). The fumed silica can have an average primary particle size of about 50 nm or less (e.g., about 45 nm or less, about 40 nm or less, about 35 nm or less, about 30 nm or less, about 30 nm or less, about 25 nm or less, about 20 nm or less, about 15 nm or less, about 10 nm or less, or about 5 nm or less). For example, the fumed silica can have an average primary particle size of about 2 nm to about 50 nm (e.g., about 5 nm to about 40 nm, about 5 nm to about 30 nm, about 5 nm to about 20 nm, about 5 nm to about 15 nm, about 10 nm to about 40 nm, about 10 nm to about 30 nm, or about 10 nm to about 20 nm).

The fumed silica can have an average aggregate particle size of about 50 nm or more (e.g., about 60 nm or more, about 70 nm or more, about 80 nm or more, about 90 nm or more, about 100 nm or more, about 150 nm or more, or about 200 nm or more). The fumed silica can have an average aggregate particle size of about 400 nm or less (e.g., about 350 nm or less, about 300 nm or less, about 250 nm or less, about 200 nm or less, about 150 nm or less, or about 100 nm or less). For example, the fumed silica can have an average aggregate particle size of about 50 nm to about 400 nm (e.g., about 100 nm to about 300 nm, or about 200 nm to about 300 nm).

The fumed silica can have a BET surface area of about 50 $m^2/g$ or more (e.g., about 100 $m^2/g$ or more, about 150 $m^2/g$ or more, about 200 $m^2/g$ or more, about 250 $m^2/g$ or more, or about 300 $m^2/g$ or more). The fumed silica can have a BET surface area of about 600 $m^2/g$ or less (e.g., about 500 $m^2/g$ or less, about 400 $m^2/g$ or less, about 300 $m^2/g$ or less, about 250 $m^2/g$ or less, or about 200 $m^2/g$ or less). For example, the fumed silica can have a BET surface area of about 50 $m^2/g$ to about 400 $m^2/g$ (e.g., about 90 $m^2/g$ to about 380 $m^2/g$, about 100 $m^2/g$ to about 350 $m^2/g$, about 150 $m^2/g$ to about 250 $m^2/g$, or about 200 $m^2/g$ to about 300 $m^2/g$).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A process for the production of fumed silica, comprising:
   (a) providing a silicon halide feedstock comprising about 80% to 100% methyltrichlorosilane,
   (b) combining the silicon halide feedstock, hydrogen gas, and an oxygen gas to form a reactant mixture, wherein the $H_2$ mole fraction of the reactant mixture is about 0.06 to about 0.11
   (c) discharging the reactant mixture out of a burner, whereby the velocity of the reactant mixture upon exiting the burner is about 30 m/s to about 50 m/s, and
   (d) combusting the hydrogen gas and the oxygen gas of the reactant mixture so as to hydrolyze the silicon halide feedstock to produce fumed silica.

2. The process of claim 1, wherein the silicon halide feedstock comprises about 90% to 100% methyltrichlorosilane.

3. The process of claim 1, wherein the silicon halide feedstock comprises about 100% methyltrichlorosilane.

4. The process of claim 1, wherein the $H_2$ mole fraction is about 0.07 to about 0.10.

5. The process of claim 1, wherein the $H_2$ mole fraction is about 0.075 to about 0.095.

6. The process of claim 1, wherein the oxygen gas is provided in the form of air.

7. The process of claim 1, wherein the oxygen gas is provided in the form of substantially pure oxygen.

8. The process of claim 1, wherein the silicon halide feedstock, the hydrogen gas, and the oxygen gas are mixed in a burner.

9. The process of claim 8, further comprising feeding a combustible gas into an annular chamber, and discharging the combustible gas near a discharge end of the burner.

10. The process of claim 9, wherein the combustible gas is hydrogen.

11. The process of claim 9, wherein the combustible gas is methane.

12. The process of claim 1, further comprising cooling the combustion process by feeding a non-combustible gas into a reaction space.

13. The process of claim 12, wherein the non-combustible gas is air.

14. The process of claim 12, wherein the non-combustible gas is oxygen.

15. The process of claim 12, wherein the non-combustible gas is nitrogen.

16. The process of claim 12, wherein the non-combustible gas is fed into a reaction chamber in the reaction space.

17. The process of claim 12, wherein the non-combustible gas is fed into an annular space adjacent to the reaction space.

18. The process of claim 1, wherein the velocity of the reactant mixture upon exiting the burner is about 35 m/s to about 45 m/s.

* * * * *